United States Patent [19]
Sakurai et al.

[11] Patent Number: 5,117,643
[45] Date of Patent: Jun. 2, 1992

[54] AUTOMOBILE AIR-CONDITIONER

[75] Inventors: Yoshihiko Sakurai; Katsumi Iida; Akihiko Takano, all of Konan; Hideo Yamaguchi, Fuchu; Teruaki Yano, Fuchu; Shigetoshi Doi, Fuchu; Taketoshi Matsushita, Fuchu, all of Japan

[73] Assignees: Zexel Corp., Tokyo; Mazda Motor Corp., Hiroshima, both of Japan

[21] Appl. No.: 645,477

[22] Filed: Jan. 24, 1991

[30] Foreign Application Priority Data

Jan. 24, 1990 [JP] Japan .................. 2-14070
Oct. 17, 1990 [JP] Japan .................. 2-278488

[51] Int. Cl.⁵ .............................. B60H 1/32
[52] U.S. Cl. ............................. 62/133; 62/228.5; 62/243; 62/323.4; 165/23; 165/43
[58] Field of Search .......... 62/133, 228.5, 323.4, 62/243, 244; 165/23, 43

[56] References Cited

U.S. PATENT DOCUMENTS

| 4,391,242 | 7/1983 | Mashio | 62/133 X |
| 4,510,764 | 4/1985 | Suzuki | 62/133 |
| 4,796,438 | 1/1989 | Sato | 62/133 |
| 4,841,737 | 6/1989 | Fujii et al. | 62/228.5 X |

Primary Examiner—Albert J. Makay
Assistant Examiner—John Sollecito
Attorney, Agent, or Firm—Wenderoth, Lind & Ponack

[57] ABSTRACT

An automobile air-conditioner capable of controlling the displacement of a compressor in view of the traveling condition and air-conditioning condition of an automobile so as to maintain a pleasant feeling of the air-conditioning and an accelerating ability of the automobile in harmony with each other. The air-conditioner includes an air-conditioning preference judgment device by means of which a normal control of the air-conditioning operation is maintained when the judgment of this judgment means indicates the existence of an air-conditioning preference condition. The air-conditioning is performed in preference to acceleration of the automobile depending on the degree of acceleration of the automobile even when the automobile is accelerated.

8 Claims, 7 Drawing Sheets

AUTOMOBILE AIR-CONDITIONER

BACKGROUND OF THE INVENTION

1. Field of the Invention:

The present invention relates generally to air-conditioners for automobiles, and more particularly to an automobile air-conditioner including a variable displacement compressor.

2. Description of the Prior Art:

One example of the automobile air-conditioners of the type concerned is disclosed in Japanese Laid-open Patent Publication No. 57-175422. The disclosed air-conditioner includes a variable displacement compressor driven by the power of an engine. The displacement of this compressor is controlled according to the cooling temperature of an evaporator. The air-conditioner also includes an acceleration sensor for detecting acceleration of the automobile to reduce the displacement of the compressor to a minimum upon detection of the acceleration, thereby lowering the engine load in the accelerated condition.

In general, the accelerating ability of the automobile falls off when the engine is started or accelerated while a part of the engine power is used for driving the compressor. Japanese Patent Laid-open Publication No. 63-90420 discloses an arrangement aimed at the prevention of a decline in accelerating ability, wherein the engine power is transmitted to the drive shaft of a compressor via an electromagnetic clutch. The electromagnetic clutch is turned off to disengage the compressor from the engine power when the automobile is accelerated. Thus, the engine power is used for the purpose of accelerating of the automobile in preference to the purpose of air-conditioning the automobile.

According to the disclosed arrangement, upon detection of an accelerating condition, the displacement of the compressor is reduced to a minimum or the operation of the compressor is stopped irrespective of the outside air temperature, the temperature in a vehicle passenger compartment or the degree or rate of acceleration. As a consequence, when the outside air temperature is relatively high or when a rapid cooling operation is desired, the discharge air temperature rises unduly, thereby deteriorating the air-conditioning feeling.

In the winter or during a change of season, the air-conditioner is driven to operate in the defrost mode using the recirculating air. During that time, if the displacement of the compressor is restricted to a minimum or the operation of the compressor is stopped, the dehumidifying ability of the air-conditioner declines. As a result, the windshield and window glasses are frosted which will induce various problems in maintaining safe driving.

SUMMARY OF THE INVENTION

With the foregoing difficulties in view, it is an object of the present invention to provide an automobile air-conditioner incorporating structural features which are responsive to a certain air-conditioning condition to reject or disregard a command signal tending to minimize the displacement of a compressor in accordance with engine driving conditions, thereby holding a desired cooling capacity without lowering the displacement of the compressor, thus maintaining a pleasant feeling of air-conditioning operation.

Another object of the present invention is to provide an automobile air-conditioner which is capable of stopping the operation of a compressor when a maximum acceleration is detected during an accelerated traveling and also is capable of holding a desired cooling capacity without lowering the displacement of the compressor when a high cooling demand signal is received during an intermediate accelerating condition, thereby maintaining a pleasant air-conditioning feeling.

According to a first aspect of the present invention, there is provided an air-conditioner for an automobile, comprising: a variable displacement compressor adapted to be driven by an engine of the automobile; a thermal load calculation means for calculating a thermal load in a passenger compartment of the automobile based on, at least, an outside air temperature, a temperature in the passenger compartment, and a setting temperature; displacement adjustment means for controlling a displacement of the compressor according to the result of calculation by the thermal load calculation means, the displacement adjustment means being operative to reduce the displacement of the compressor to a minimum irrespective of the result of calculation by the thermal load calculation means when an external command signal tending to minimizing the displacement of the compressor is inputted; an air-conditioning preference judgment means for judging whether or not the thermal load condition in the passenger compartment is an air-conditioning preference condition in which the compressor is continuously operated without reducing its displacement to a minimum even when the external command signal is inputted; and input inhibiting means for inhibiting the external command signal from being inputted into the displacement adjustment means when judgment by the air-conditioning preference judgment means indicates that the thermal load condition is the air-conditioning preference condition.

With this construction, when the air-conditioning preference judgment means judges the thermal load condition in the passenger compartment is equivalent to an air-conditioning preference condition, this means that the compressor must operates continuously without reducing its displacement to a minimum. In this case, even when an external command signal tending to minimize the displacement of the compressor is inputted, the input inhibition means rejects or inhibits the external command signal from being inputted to the displacement adjustment means, thus preventing the compressor from operating at a minimum displacement.

According to a second aspect of the present invention, there is provided an air-conditioner for an automobile, comprising: a variable displacement compressor adapted to be driven by an engine of the automobile; a thermal load calculation means for calculating a thermal load in a passenger compartment of the automobile based on, at least, an outside air temperature, a temperature in the passenger compartment, and a setting temperature; displacement adjustment means for controlling a displacement of the compressor according to the result of calculation by the thermal load calculation means; an acceleration detection means for detecting an acceleration of the automobile; traveling condition judgment means for making a judging based on an output from the acceleration detection means to determine whether the automobile is accelerated above a predetermined level, is accelerated at an intermediate level lower than the predetermined level or is not accelerated; air-conditioning preference judgment means for judging whether or not the passenger compartment is in an air-conditioning preference condition in which the compressor is continuously operated without reducing its displacement; and a compressor drive control means for controlling the operation of the compressor in such a manner that the compressor is stopped when the judgment by the traveling condition judgment means indicates that the automobile is accelerated at the predetermined level, the compressor reduces its displacement irrespective of the result of calculation by the thermal load calculation means when the judgment by the traveling condition judgment means indicates that the automobile is accelerated at the intermediate level and when the judgment by the air-conditioning preference judgment means indicates that the passenger compartment is not in the air-conditioning preference condition, and the compressor varies its displacement under the control of the displacement adjustment means in the other cases.

With this construction, when the judgment by the traveling condition judgment means indicates the accelerated condition exceeding the predetermined level, this means that a need for an accelerated traveling is preferred. Thus, a portion of the engine load which is needed for operating the compressor is removed, thereby avoiding a decline in accelerating ability which will hinder a smooth traveling of the automobile. In an intermediate accelerated condition, the need for an accelerated traveling is not so high. Consequently, the compressor drive control means harmonizes the cooling capacity and the accelerating ability depending on the degree of need for air-conditioning (cooling) of the passenger compartment. In the case where the air-conditioning (cooling) is highly desired, a normal cooling capacity is maintained even if the accelerating ability is limited to some extent by the operation of the compressor. In the case where the need for air-conditioning (cooling) is low, the displacement of the compressor is reduced so as to improve the acceleration ability in preference to the cooling capacity of the air-conditioner.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to certain preferred embodiments shown in the accompanying drawings.

Figure 1:
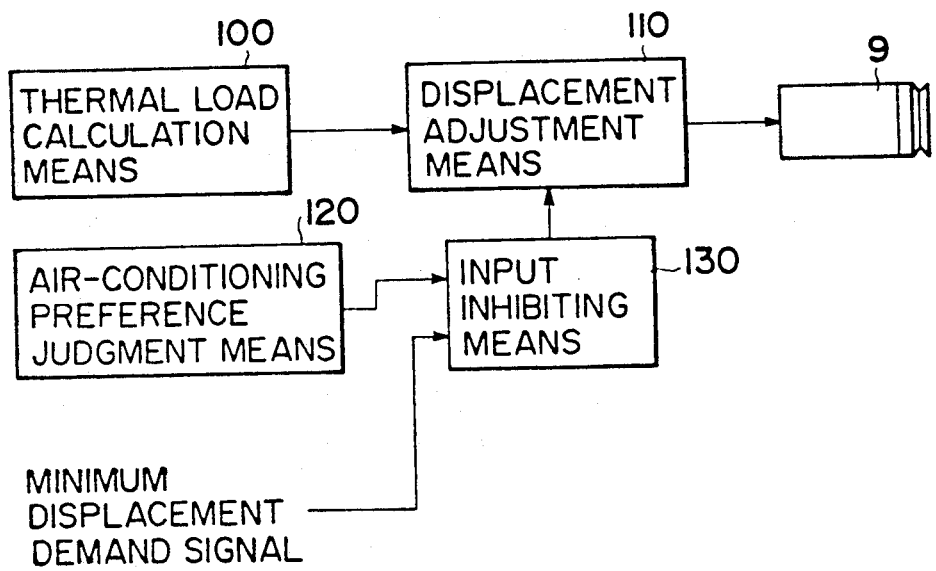
FIG. 1 is a block diagram showing the functional construction of an automobile air-conditioner according to a first embodiment of the present invention.
Figure 2:
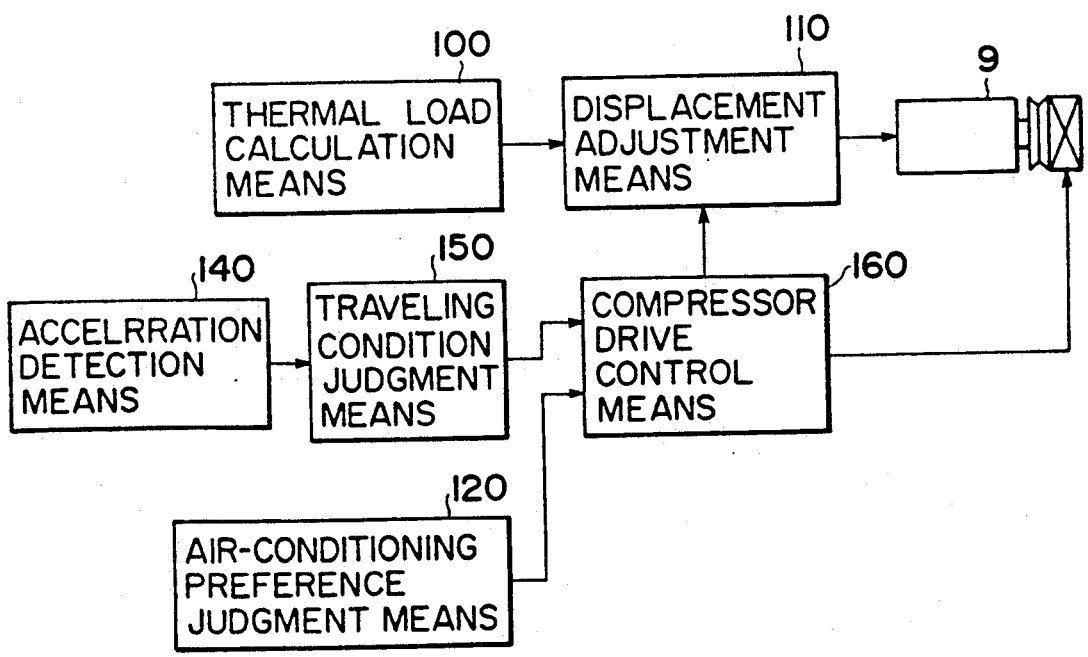
FIG. 2 is a block diagram showing the functional construction of an automobile air-conditioner according to a second embodiment of this invention.

FIGS. 1 and 2 show the functional construction of first and second embodiments of this invention.

As shown in FIG. 1, an air-conditioner for an automobile according to the first embodiment comprises a variable displacement compressor 9 adapted to be driven by an engine of the automobile; a thermal load calculation means 100 for calculating a thermal load in a passenger compartment of the automobile based on, at least, an outside air temperature, a temperature in the passenger compartment, and a setting temperature; a displacement adjustment means 110 for controlling a displacement of the compressor 9 according to the result of calculation by the thermal load calculation means 100, the displacement adjustment means 110 being operative to reduce the displacement of the compressor 9 to a minimum irrespective of the result of calculation by the thermal load calculation means 100 when an external command signal tending to minimizing the displacement of the compressor 9 is inputted; an air-conditioning preference judgment means 120 for judging whether or not the thermal load condition in the passenger compartment is an air-conditioning preference condition in which the compressor 9 is continuously operated without reducing its displacement to a minimum even when the external command signal is inputted; and an input inhibiting means 130 for inhibiting the external command signal from being inputted into the displacement adjustment means 110 when judgment by the air-conditioning preference judgment means 120 indicates that the thermal load condition is the air-conditioning preference condition.

As shown in FIG. 2, an air-conditioner for an automobile according to the second embodiment comprises a variable displacement compressor 9 adapted to be driven by an engine of the automobile; a thermal load calculation means 100 for calculating a thermal load in a passenger compartment of the automobile based on, at least, an outside air temperature, a temperature in the passenger compartment, and a setting temperature; displacement adjustment means 110 for controlling a displacement of the compressor 9 according to the result of calculation by the thermal load calculation means 100; an acceleration detection means 140 for detecting an acceleration of the automobile; traveling condition judgment means 150 for making a judging based on an output from the acceleration detection means 140 to determine whether the automobile is accelerated above a predetermined level, is accelerated at an intermediate level lower than the predetermined level or is not accelerated; an air-conditioning preference judgment means 120 for judging whether or not the passenger compartment is in an air-conditioning preference condition in which the compressor 9 is continuously operated without reducing its displacement; and compressor drive control means 160 for controlling the operation of the compressor 9 in such a manner that the compressor 9 is stopped when the judgment by the traveling condition judgment means 150 indicates that the automobile is accelerated at the predetermined level, the compressor 9 reduces its displacement irrespective of the result of calculation by the thermal load calculation means 100 when the judgment by the traveling condition judgment means 150 indicates that the automobile is accelerated at the intermediate level and when the judgment by the air-conditioning preference judgment means 120 indicates that the passenger compartment is not in the air-conditioning preference condition, and the compressor 9 varies its displacement under the control of the displacement adjustment means 110 in the other cases.

Figure 3:
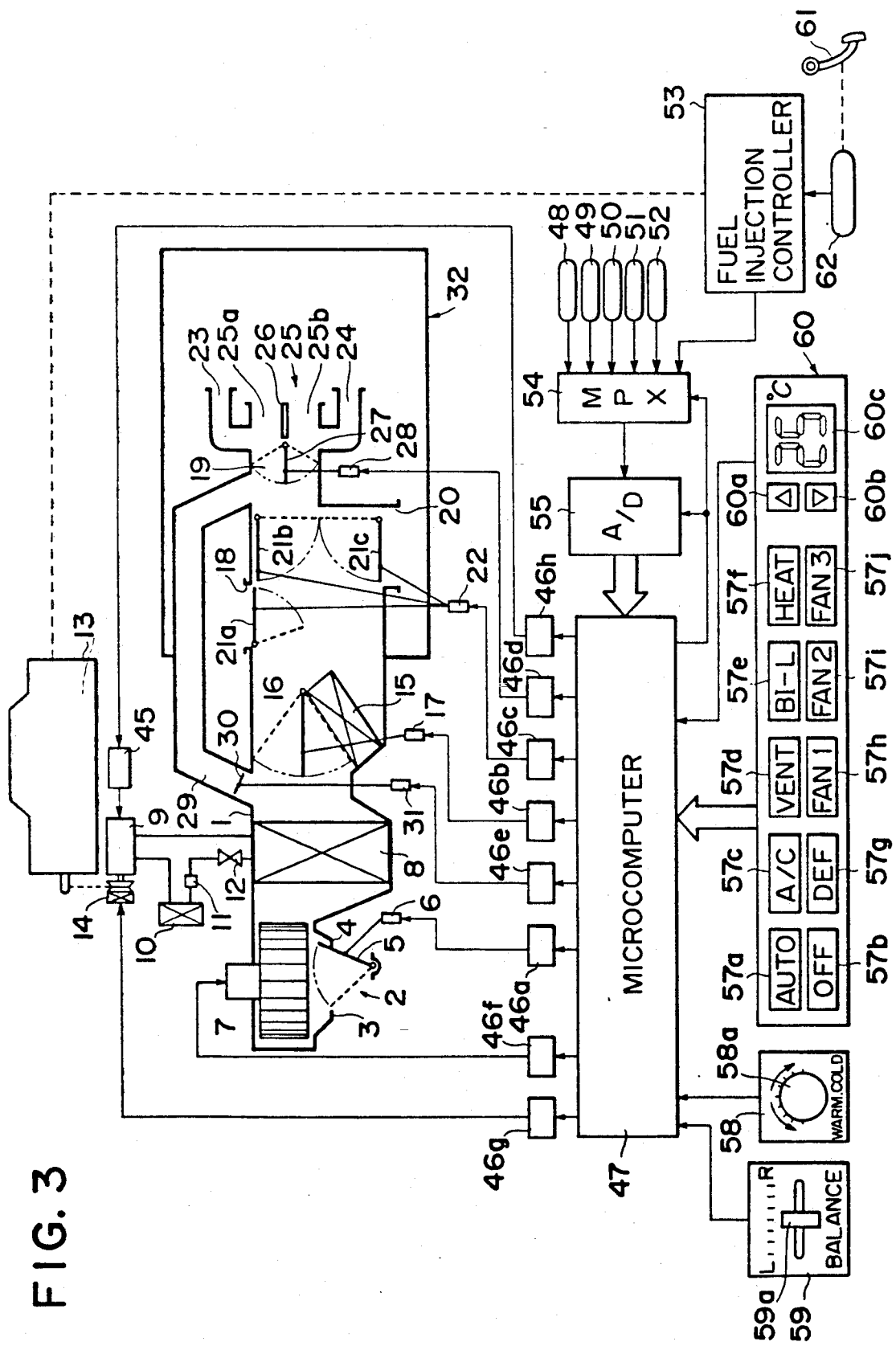
FIG. 3 is a diagrammatical view showing the general construction of an automobile air-conditioner according to the present invention.

FIG. 3 diagrammatically shows the general construction of an automobile air-conditioner of this invention. The air-conditioner includes an air-flow duct 1 having an intake door changeover device 2 at its upstream end. The intake door changeover device 2 includes a selector door 5 disposed at the junction between a recirculating air inlet 2 and an outside air inlet 3 provided at the upstream end of the air-flow duct 1 in bifurcated fashion. The selector door 5 is actuated by an actuator 6 to select the recirculated air or the outside air to be introduced into the airflow duct 1, so that a desired intake mode is obtained.

A blower 7 is disposed in the air-flow duct 1 adjacent to the air inlets 2 and 3 for forcing the air to flow downstream through the air-flow duct 1. The duct 1 also includes an evaporator 8 disposed downstream of the blower 7. The evaporator 8 is connected by piping with a compressor 9, a condenser 10, a receiver tank 11 and an extension valve 12 to jointly constitute a refrigeration system or cycle. The compressor 9 is connected with an engine 13 via an electromagnetic clutch 14 so that by engaging and disengaging the electromagnetic clutch 14, the operation of the compressor 9 is controlled.

A heater core 15 is disposed downstream of the evaporator 8, and an air-mix door 16 is disposed upstream of the heater core 15. The angular position of the air-mix door 16, that is, the opening of the air-mix door 16 is regulated by an actuator 17 so that proportions of air flowing through the heater core 15 and air bypassing the heater core 15 are changed to thereby control the temperature of air to be discharged from the air-conditioner.

The air-flow duct 1 has at its downstream end a defroster outlet 18, a vent outlet 19 and a foot side outlet 20 what are provided in branched fashion and all open to a passenger compartment 32. Three mode doors 21a, 21b, and 21c are disposed adjacent to the respective outlets 18, 19, and 20. The mode doors 21a–21c are selectively opened and closed by an actuator 22 to provide a desired discharge mode.

The downstream end of the vent outlet 19 is connected to a right air outlet 23 opening to the right side of the passenger compartment 32, a left air outlet 24 opening to the left side of the passenger compartment 32, and a central air outlet 25 disposed centrally between the right and left air outlets 23 and 24. The central air outlet 25 is separated by a partition wall or plate 26 into a right side central air outlet 25a and a left side central air outlet 25b. An air-distribution door 27 is disposed in front of the partition plate 26 on the upstream side of the air-flow duct 1. The air-distribution door 27 is controlled by an actuator 28 to adjust proportions of air to be distributed to the right side of the passenger compartment 32 from the right air outlet 23 and the right side central air outlet 25a, and air to be distributed to the left side of the passenger compartment 32 from the left air outlet 24 and the left side central air outlet 25b.

The air-conditioner further includes a cool air bypass or passage 29 bypassing a portion of the air-flow duct 1. The bypass passage 29 has one end or an upstream end connected to the air-flow duct 1 at a point between the evaporator 8 and the air-mix door 16, and the other end or the downstream end connected to the air-flow duct 1 at a point immediately upstream of the vent outlet 19. With the bypass passage 29 thus provided, a portion of air passing through the evaporator 8 can be supplied directly to the vent outlet 19. The quantity of cool air supplied through the cool air bypass passage 29 is regulated depending on the opening of a cool air bypass door 30 which is disposed in the bypass passage 29 and actuated by an actuator 31.

Figure 4:
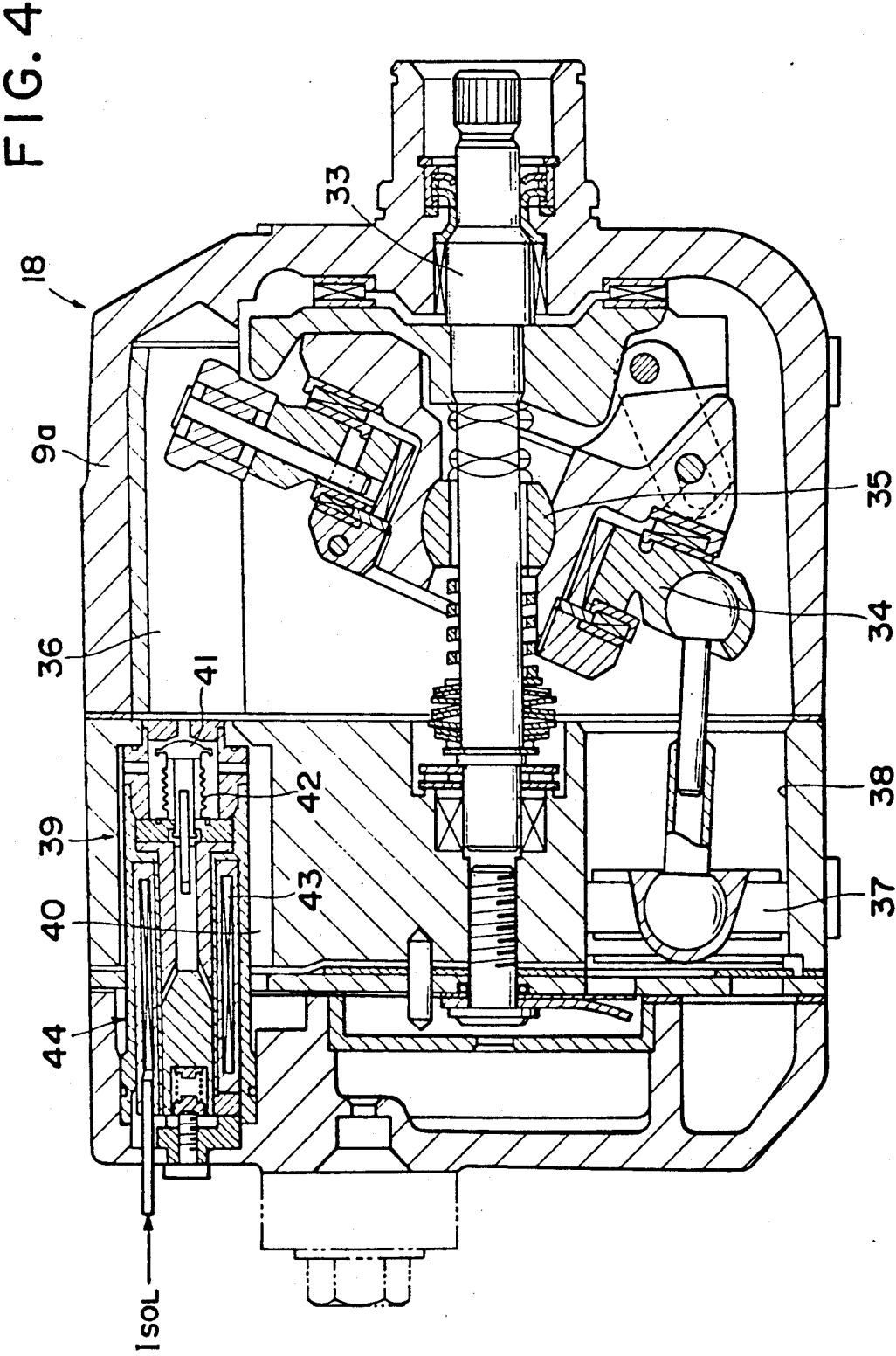
FIG. 4 is a longitudinal cross-sectional view of a variable displacement compressor incorporated in the air-conditioner shown in FIG. 3.

The compressor 9 is a variable displacement compressor of the swash plate type, for example. The swash plate type variable displacement compressor includes, as shown in FIG. 4, a drive shaft 33 disposed in a compressor body 9a and coupled to an engine 13 (FIG. 3) via an electromagnetic clutch 14 (FIG. 3), and a swash plate 34 mounted on the drive shaft 33 by a hinge ball 35. The swash plate 34 thus mounted on the drive shaft 33 oscillates or swings about the hinge ball 35 within a crank chamber 36 so that at least one piston 37 connected to the swash plate 34 is reciprocated in a cylinder bore 38 in response to the oscillation of the swash plate 34. The variable displacement compressor g further has a pressure control valve 39 facing the crank chamber 36. The pressure control valve 39 includes a valve element 41 movable for adjusting the degree of communication between the crank chamber 36 and an intake chamber 40 communicating the intake side of the compressor 9, a pressure responsive member 42 responsive to the pressure in the intake chamber 40 for moving the valve element 41, and a solenoid 44 for displacing the valve element 41 according to the magnitude of an exiting current $I_{SOL}$ supplied to an electromagnetic coil 43. With the pressure control valve 39 thus constructed, the amount the blowby gas (leaking between the piston 37 and the cylinder bore 38) returned from the crank chamber 36 to the intake side can be adjusted by externally controlling the exciting current $I_{SOL}$ of the electromagnetic coil 43.

The pressure control valve 39 constitutes a main part of a displacement adjustment device 45 (FIG. 3) which serves to change the displacement of the variable displacement compressor 9. When the exciting current $I_{SOL}$ flowing through the electromagnetic coil 43 is increased to enhance the magnetic force of the solenoid 44, the valve element 41 is displaced in a direction to reduce or limit the communication between the crank chamber 36 and the intake chamber 40, thereby lowering the amount of return of the blowby gas from the crank chamber 36 and the intake chamber 40. As a consequence, the pressure in the crank chamber 36 rises, so that the force or pressure acting on the back of the piston 37 increases. Thus, the swash plate 34 is pivoted about the hinge ball 35 in a direction to reduce its angle of oscillation, thereby reducing the stroke of the piston 37. The displacement of the compressor 9 is thus reduced.

The displacement adjustment device 45 is not limited to the pressure control valve 39 which is constructed to adjust the return of the blowby gas to the intake side, as described above. It may be constructed to change the number of cylinders in the compressor, or the pulley ratio of a belt transmission mechanism coupling the compressor 9 and the engine 13. In the case of a variable displacement compressor of the rotary vane type, the displacement adjustment device is constructed to change the number of effective vanes, thereby varying the displacement of the compressor.

The actuators 6, 17, 22, 28 and 31, a motor of the blower 7, the electromagnetic clutch 14 and the displacement adjustment device 45 of the variable displacement compressor 9 are controlled by output signals supplied thereto from a microcomputer 47 through corresponding driver circuits 46a-46h shown in FIG. 3.

As shown in FIG. 3, the automobile air-conditioner further includes a potentiometer 48 for detecting the opening of the air-mix door 16, a solar radiation sensor 49 for detecting the quantity of solar radiation coming from the lateral (left and right) directions of the passenger compartment 32, an outside air temperature sensor 50 for detecting the temperature Ta of the outside air, a compartment temperature sensor 51 for detecting the temperature Tr in the passenger compartment 32, and an evaporator temperature sensor 52 disposed at the evaporator 8 or quite close to the downstream of the evaporator 8 for detecting the evaporator temperature $T_E$. Output signals from the foregoing meter and sensors 48-52, a control signal from a fuel injection controller 53, and a signal from an engine control unit (not shown) are supplied into a multiplexer 54 and then inputted into an A/D converter 55 in the order selected by the multiplexer 54. The A/D converter 55 digitizes the input signals which in turn are inputted into a microcomputer 47.

Figure 5A:
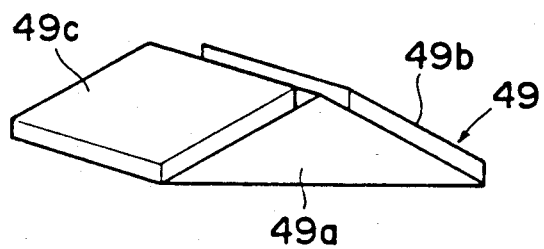
FIG. 5(a) is a perspective view of a solar radiation sensor incorporated in the air-conditioner shown in FIG. 3.

The solar radiation sensor 49, as shown in FIG. 5(a), generally includes a triangular roof-like sensor base 49a, and a pair of photoelectric transducers 49b, 49c such as photodiodes disposed on left and right sloped side surfaces of the triangular sensor body 49a.

Figure 5B:
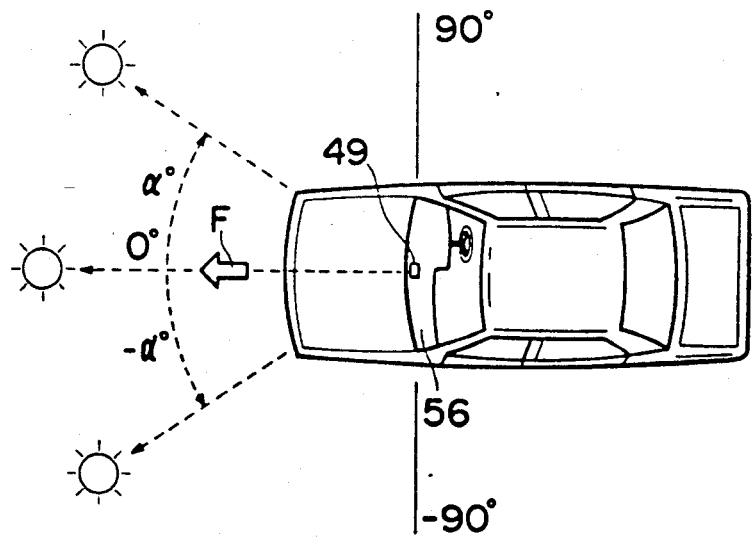
FIG. 5(b) is a top plane view illustrative of the manner in which the solar radiation sensor is disposed.

As shown in FIG. 5(b), the solar radiation sensor 49 thus constructed is attached to the center of an upper surface 56 of an instrument panel of the automobile with a ridge of the triangular sensor base 49a extending parallel to the direction of travel of the automobile (indicated by the arrow F). In this figure, the broken lines aligned with the ridge of the sensor base 49a designate a reference line and the right side in the traveling direction of the automobile with respect to the reference line has a positive azimuth angle, while the left side in the traveling direction of the automobile with respect to the reference line has a negative azimuth angle.

The fuel injection controller 53 for controlling the operation of the engine 13 according to traveling conditions of the automobile is responsive to a detected signal inputted from an acceleration sensor 62 which detects the amount of depressing of an accelerator pedal 61 of the automobile. The fuel injection controller 53 adjusts the fuel injection timing of a fuel injector (not shown) to control the operation of the engine 13. In the illustrated embodiment, the fuel injection controller 53 makes a judgment based on the engine driving conditions so as to determine whether the displacement of the compressor 9 is reduced to a minimum so as to lower the engine load, and if the judgment indicates that the engine load should be lowered, then the fuel injection controller 53 outputs a command signal tending to reduce the displacement of the compressor to a minimum, and when the automobile is traveling under a certain condition such as an accelerated condition, the fuel injection controller 53 outputs a command signal tending to stop the operation of the compressor 9.

The microcomputer 47 is further supplied with signals inputted from a console panel 57, a head part temperature setter 58, and an air-distribution setter 59.

The console panel 57 is equipped with an AUTO switch 57a for placing all components of the air-conditioning unit such as blower into an automatically controlled condition, an Off switch 57b for stopping the operation of the components of the air-conditioning unit, an A/C switch 57c for manually starting the refrigeration cycle, mode switches 57d-57g for setting the discharge mode into the VENT mode (by 58d), BI-L (bilevel) mode (by 57e), HEAT mode (by 57f) and DEF (defrost) mode (by 57g), fan switches 57h-57j for changing over the speed of rotation of the blower 7 between a low speed level (FAN1 57h), an intermediate speed level (FAN2 57i), and a high speed level (FAN3 57j), and a temperature setter 60 for adjustably setting the temperature Td in the passenger compartment 32. The temperature setter 60 is composed of up-and-down switches 60a and 60b and an indicator or display 60c for indicating the setting temperature. By properly actuating the up-and-down switches 60a and 60b, the setting temperature shown in the display 60c can be varied within a predetermined range.

The head part temperature setter 58 has a dial 58a which is actuatable to change the head part setting temperature Ths within a predetermined range.

The air-distribution setter 59 includes a slidable adjustment lever 59a actuatable for manually setting the position of the air-distribution door 27 described above. As the adjustment lever 59a is displaced from the central position toward the left (designated by "L" in FIG. 3), the amount of air discharged from the left air outlet 24 and the left side central air outlet 25b is increased. The amount of air discharged from the right air outlet 23 and the right side central air outlet 25a increases with an displacement of the adjustment lever 59a from the central position toward the right (designated by "R" in FIG. 3).

The microcomputer 47 is of the construction known per se and includes a central processing unit (CPU), a read only memory (ROM), a random access memory (RAM), an input/output port (I/O), etc. Based on various input signals described above the microcomputer 47 performs control programs stored therein to output control signals to the driver circuits 46a-46h for the control of the actuator 6, for example.

Figure 6:
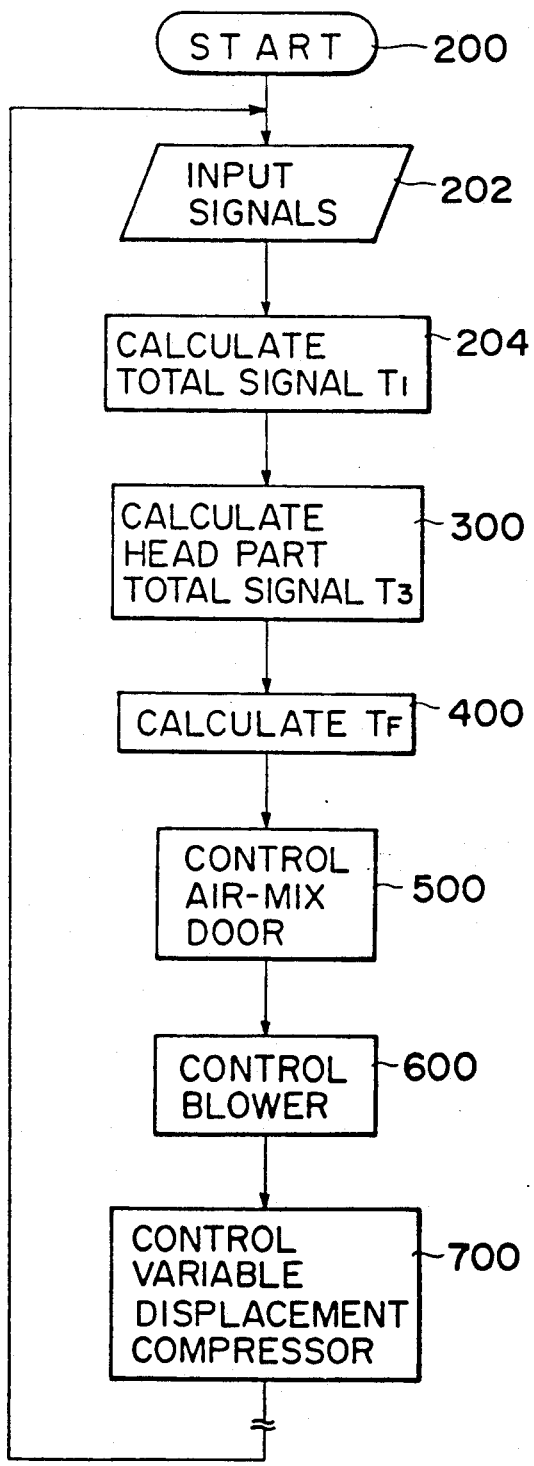
FIG. 6 is a flowchart showing a main control routine achieved by a microcomputer incorporated in the air-conditioner.

Operation of the microcomputer 47 will be described below with reference to a main control routine illustrated by a flowchart shown in FIG. 6.

A step 200 starts the control routine of the microcomputer 47 and in the next following step 202, detected signals from the various sensors are inputted. After the data input process, the control advances to a step 204.

The step 204 calculate a total signal $T_1$ in accordance with the following expression (1) by using the input signals, the total signal $T_1$ being equivalent to a thermal load in the passenger compartment.

$$T_1 = K_1(Tr\text{-}25) + K_2(Tad\text{-}25) + K_3 Tsc - K_4(Td\text{-}25) + C_1 + C_2 \qquad (1)$$

where $K_1$-$K_4$ are calculation coefficients, $C_2$ is a calculation constant, Tr is the passenger compartment temperature, Tad is a value obtained after the outside air temperature Ta detected by the outside air sensor 50 is subjected to a signal delaying process details of which are not described here. Tad being referred to as "delayed outside air temperature". Tsc is a value obtained after the solar radiation quantity detected by the solar radiation sensor 49 is subjected into a predetermined signal processing operation details of which are not described here, and $C_1$ is a value obtained by the following expression (2).

$$C_1 = K_5(0 - Tad) \quad (2)$$

where $K_5$ is a calculation coefficient. $C_1$ is used only when Tad is lower than 0° C. If Tad is higher than 0° C., $C_1 = 0$.

After the total signal $T_1$ is calculated, the control goes on to a step 300.

The step 300 calculates a head part total signal $T_3$ in accordance with the following expression (3). $T_3$ is used for determine the opening of the cool air bypass door 30.

$$T_3 = K_6 \cdot Tsc - K_7(Ths - 25) \quad (3)$$

where K6 and K7 are calculation coefficients, Tsc is a signal indicative of the signal-processed solar radiation quantity as described above, and Ths is the head part setting temperature. After this calculation step, the control advances to a step 400.

The step 400 calculates a signal $T_F$ in accordance with the following expression (4), the signal $T_F$ being used for a criterion for the selection of the discharge mode.

$$T_F = Te + K_8 \theta xt \quad (4)$$

where $K_8$ is a calculation coefficient, Te is the evaporator temperature and $\theta xt$ is the target opening of the air-mix door 16. After this calculation step, the control proceeds to a step 500.

The step 500 performs a control of the operation of the air-mix door 16 according to the calculated total signal value $T_1$. Thereafter, the control advances to a step 600 where the flow rate of the blower 7 is controlled according to the total signal value $T_1$.

After the step 600, the control proceeds to a step 700 so as to control the operation of the variable displacement compressor 9. The control performed in this step 700 includes a control of the displacement of the variable displacement compressor 9 according to the temperature of the evaporator 8, a rapid cool down control in which the compressor 9 is driven at a maximum displacement so as to improve the cooling down performance under a certain condition when the cooling operation is started, and a control to determine whether a command signal delivered from the fuel injection controller 53 for minimizing the displacement of the compressor 9 is accepted or not (this control being described below in greater detail and hereinafter referred to as "acceleration control"). Thus, the general control of the compressor 9 is carried out in the step 700.

After the step 700, the control advances to a control step, not shown, from which it is returned to the step 202. Subsequently, the foregoing control steps described above are repeated.

The acceleration control which is achieved as a part of the control of the variable displacement compressor 9 will be described below with reference to a subroutine illustrated by a flowchart shown in FIG. 7.

The control subroutine of the microcomputer 47 starts from a step 702 and in the next following step 704, it is determined whether a command signal for interrupting the operation of the compressor 9 is delivered from the fuel injection controller 53. If the command signal is inputted (YES), the control advances to a step 706 which outputs a predetermined control signal to the driver circuit 46g for turning off the electromagnetic clutch 14, thereby stopping operation of the compressor 9.

When the fuel injection controller 53 requires the compressor 9 to be stopped, this means that the load on the engine 13 is increased, for example, when the automobile is accelerated. In this instance, the operation of the compressor is unconditionally stopped making great account of the driving stability of the automobile.

After the step 706, the control advances to a step 708 which sets the flag A to "1". Thereafter, the control returns to the main control routine via a step 732. The flag A is used to identify the driving condition of the compressor 9. When the compressor is operating, the flag A is set to "1", while the flag A is set to "0" when the operation of the compressor 9 is stopped.

If the judgment by the step 704 indicate the absence of the command signal (NO), the control goes on to a step 710 which makes a judgment whether the flag A is "1" or not. If flag A is "1" (YES), the control advances to a step 720. Conversely, if the flag A is not equal to "1" (NO), the control goes on to a step 712.

The step 720 judges whether or not the timer is operating (ON condition). If the timer is operating (YES), the control jumps into a step 724 over the next step 722. If the timer is in the inoperative condition (NO), the control advances to the step 722 which starts the timer. Subsequently, the control further advances to the step 724.

The step 724 judges whether the elapsed time period T after the start of the timer exceeds a predetermined value $\alpha$. If $T > \alpha$ (YES), the control advances to a step 726 which in turn starts operation of the compressor 9. The predetermined value $\alpha$ is about 0.5 sec., for example.

As described above, the interruption of operation of the compressor 9 is performed not immediately after the start of the timer but after expiration of the predetermined time period $\alpha$. This is because the engine 13 needs a certain period of time so as to comply with a change in load torque of the engine 13 which is caused by interruption of the operation of the compressor 9. During the predetermined time period, the fuel injection controller 53 adjusts the fuel supply and the fuel injection timing so as to bring the engine 13 into a condition to conform to the torque change.

After the step 726, the control further advances to a step 728 which in turn sets the flag A to "0". Subsequently, the control advances a step 730 which stops operation of the timer. Then, the control returns to the main control routine via the step 732.

If the judgment by the step 710 indicates the NO condition and the control advances to the step 712, accordingly, the step 712 judges whether a command signal is inputted from the fuel injection controller 53 so as to reduce the displacement of the compressor 9 to a minimum. If the judgment indicates the presence of the input command signal (YES), then the control advances to a step 714. Conversely, if the judgment by the step 712 indicates the absence of the input command signal (NO), the control goes on to a step 716.

The step 714 judges whether or not the current air-conditioning condition is an air-conditioning preference condition. The air-conditioning preference condition is valid when one of the following conditions is satisfied.
(1) the A/C switch 57c is depressed or turned on;
(2) the DEF mode switch 57g is depressed or turned on;
(3) the setting temperature Td is minimal;
(4) the total signal value $T_1$ exceeds a predetermined level $\beta$; and
(5) the head part total signal value $T_3$ exceeds a predetermined level $\tau$ and the delayed outside air temperature Tad exceeds a predetermined value $\delta$.

When the A/C switch 57c is depressed as described in the preceding paragraph (1), this means that the occupant is desirous of cooling the passenger compartment and hence the compressor 9 is driven to start the refrigeration cycle until the evaporator 8 has a predetermined temperature (about 3° C., for example). This condition constitutes one of the preferential conditions.

When the DEF mode switch 57g is depressed as described in the preceding paragraph (2), this means that the frost on the windshield and wind glasses must be removed. This condition constitutes one of the preferential conditions from the safety point of view.

When the setting temperature Td is a minimum level as described in the preceding paragraph (3), this means that a maximum cooling capacity is needed. This condition constitutes one of the preferential conditions in view of the occupant's desire.

When the total signal value $T_1$ exceeds the predetermined level $\beta$ as described in the preceding paragraph (4), this means that the cooling load is relatively large. This condition constitutes one of the preferential conditions so as to keep the air-conditioning condition without undue fluctuation.

When the head part total signal value $T_3$ exceeds the predetermined level $\tau$ and the delayed outside air temperature Tad exceeds the predetermined value $\delta$ as described in the preceding paragraph (5), this means that the outside air temperature is relatively high and an enhanced cooling in the vicinity of the head of an occupant is greatly requested. In this instance, if the displacement of the compressor 9 is minimized, a notable deterioration of air-conditioning feeling would result. Accordingly, this condition constitutes one of the preferential conditions in the light of avoidance of the deterioration of the air-conditioning feeling.

If the judgment by the step 714 indicates that one of the preceding preferential conditions (1)-(5) is satisfied (YES), this means that the current condition is the air-conditioning preference condition. Accordingly, the control goes on to the step 716. In other cases (NO), the control advances to a step 718.

The step 716 controls the compressor 9 in the normal control mode under the control of an $I_{SOL}$. The compressor 9 of the illustrated air-conditioner is of the variable displacement type, as described above, and the displacement of such compressor can be varied by changing the exciting current $I_{SOL}$ flowing through the electromagnetic coil 43 disposed in the compressor 9. The $I_{SOL}$ is determined depending on deviations between target evaporator sensor temperatures which are predetermined according to the total signal $T_1$, and actual evaporator sensor temperatures. The normal control mode of the compressor is thus performed.

The step 718 sets the $I_{SOL}$ to a predetermined value $i_1$. The $i_1$ is a value which is necessary to minimize the displacement of the compressor 9. Thus, the step 718 sets the displacement of the compressor 9 to minimal.

After the step 716 or the step 718, the control returns to the main control routine via the step 732.

Operation of the air-conditioner of the foregoing construction will be summarized below.

The air-conditioner is started when a start switch, not shown, is turned on. In the case where neither a command signal tending to minimize the displacement of the compressor 9 nor a command signal tending to stopping operation of the compressor 9 is delivered from the fuel injection controller 53, and the AUTO switch 57a is depressed, the displacement of the compressor 9 is controlled according to the total signal. In this instance, a control, the so-called thermo-control is also performed for deactivating the compressor 9 when the temperature of the evaporator 8 reaches to a predetermined level.

Under such condition, when the DEF mode switch 57g is depressed by the occupant, the discharge mode is set to the defrost mode. Accordingly, air of a relatively low temperature is discharged from the defrost outlet 18 to remove the frost on the windows and also dehumidify the passenger compartment. In this instance, if a command signal tending to minimize the displacement of the compressor 9 is inputted from the fuel injection controller 53, the microcomputer 47 judges that the current condition is an air-conditioning preference condition. Thus the foregoing air-conditioning operation is continued.

When the DEF mode switch 57 is depressed again, the defrost mode is terminated whereupon the operation of the air-conditioner returns to its initial automatic control mode. In this instance, if a command signal tending to minimizing the displacement of the compressor 9 is inputted from the fuel injection controller 53, the microcomputer 47 accepts this command signal and control the displacement adjustment device 45 to keep the displacement of the compressor 9 at a minimum level.

When the command signal tending to minimizing the displacement of the compressor 9 disappears, the compressor 9 is operated in the normal control mode described above.

Then, a control of the operation of the compressor 9 according to the second embodiment shown in FIG. 2 will be described below. The second embodiment is similar to the first embodiment described above in that the fuel injection controller 53 controls the operating condition of the engine 13 based on a signal from the acceleration sensor 62. A difference is that the fuel injection controller 53 inputs a signal representing the accelerating condition of the automobile into the multiplexer 54 when a detected signal from the acceleration sensor 62 is inputted.

Figure 8:
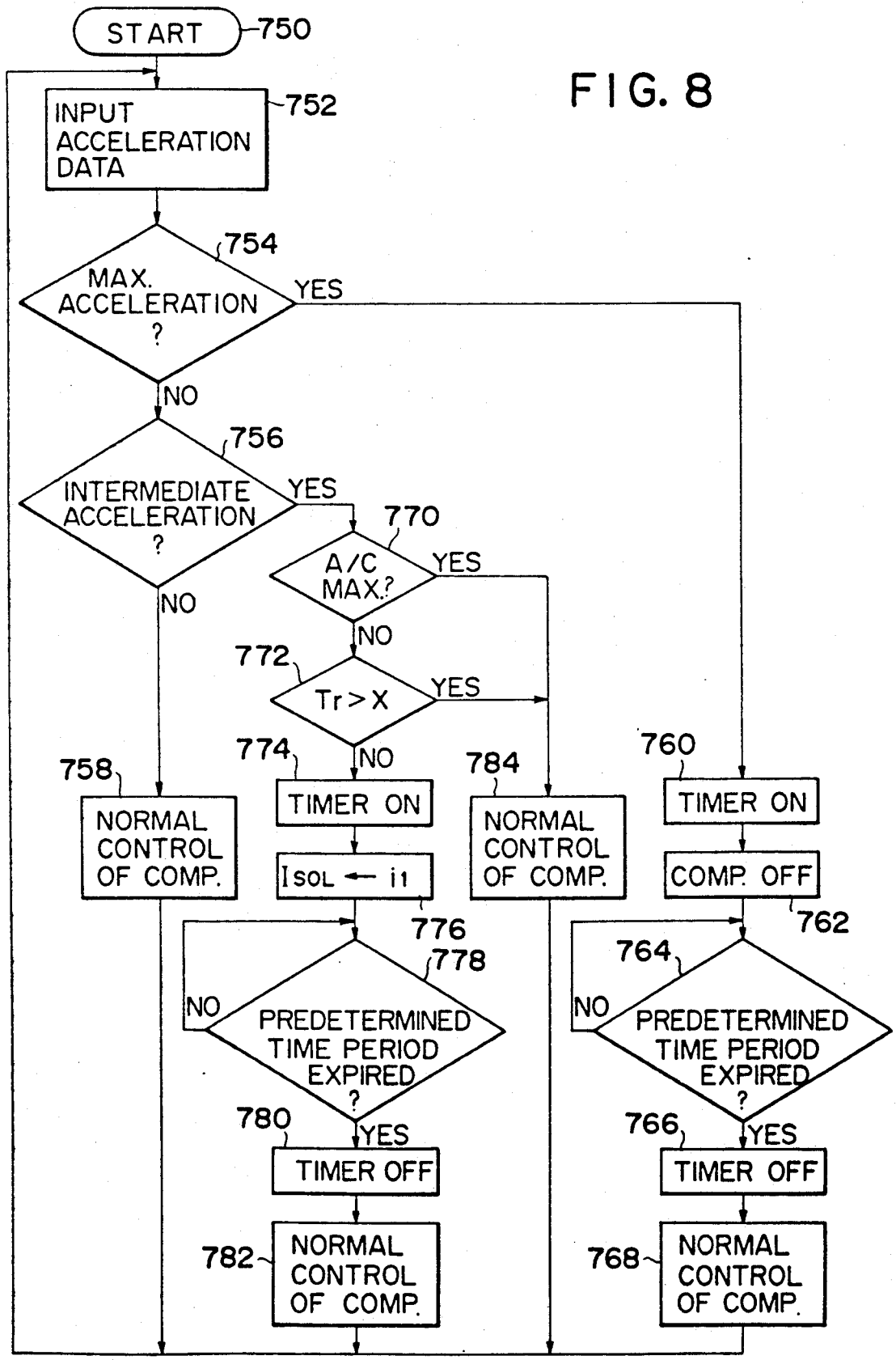
FIG. 8 is a flowchart showing a subroutine achieved by the microcomputer for the control of acceleration of the automobile according to the second embodiment of this invention.

The acceleration control which is performed as a part of the control of the variable displacement compressor indicated by the step 700 in FIG. 5 is illustrated by a flowchart shown in FIG. 8. A description will be given to the accelerating control with reference to the flowchart shown in FIG. 8. Other structural components and other processing of the main control routine are the same as those shown in FIGS. 3 through 6, and a further description is no longer needed.

The control routine of the microcomputer 47 starts from a step 750 and then advances to a step 752 which inputs signals representing information on acceleration of the automobile from the fuel injection controller 53. A next step 754 judges based on the inputted signal on the acceleration information whether the automobile is accelerated at a maximum level. In the following step 756, an additional judgment is made to determine whether the automobile is accelerated at an intermediate level. The judgment by the step 754 may rely on whether or not the depression of the accelerator pedal 61 is maximal. Likewise, the judgment by the step 756 is performed in reliance upon the determination as to whether the depression of the accelerator pedal 61 is not maximal but is in an accelerated level.

Figure 7:
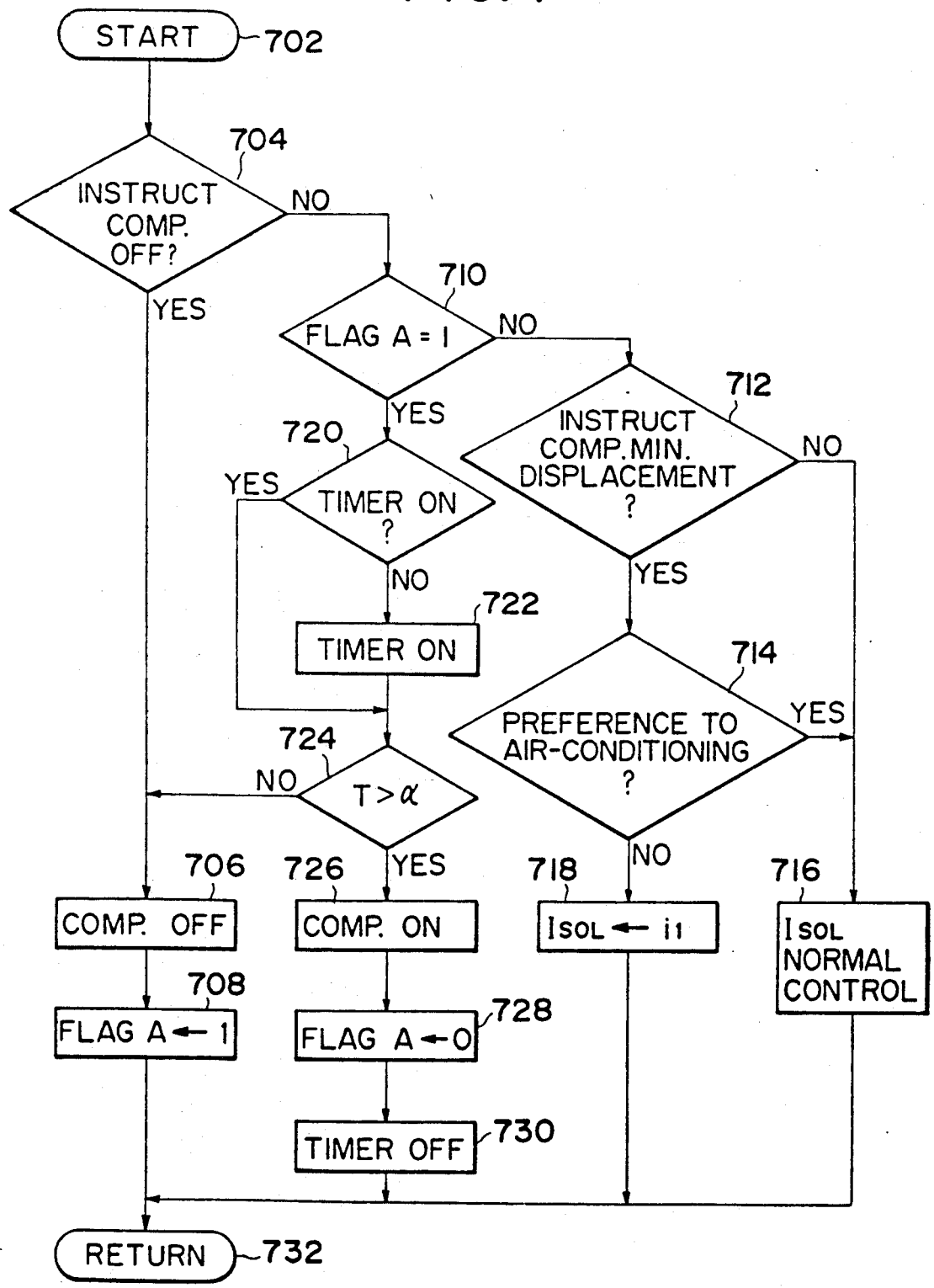
FIG. 7 is a flowchart showing a subroutine achieved by the microcomputer for the control of acceleration of the automobile.

When the automobile is not accelerating, that is, the automobile is cruising at a constant speed, for example, the control advances to a step 758 which in turn performs a normal control of the compressor 9 (which is identical to the normal control indicated by the step 716 in FIG. 7).

If the step 754 judges that the automobile is fully accelerated (YES), the control goes on to a step 760 which in turn starts a timer in the microcomputer 47 to count the time period elapsing after detection of a maximum accelerated condition. A next step 762 outputs a predetermined control signal to the driver circuit 46g to disengage the electromagnetic clutch 14, thereby stopping operation of the compressor 9. Thereafter, a step 764 judges whether a predetermined period of time (5 sec., for example) has elapsed after the start of counting by the step 760. If the predetermined time period has elapsed (YES), then the control advances to a step 766 which in turn resets the timer, that it, the timer is stopped. Subsequently, a step 768 engages the electromagnetic clutch 14 to thereby operate the compressor 9 in the normal condition mode. By a series of control steps 760-768, the operation of the compressor 9 is temporarily stopped when the automobile is accelerated at a maximum level, thereby lowering the engine load.

When the automobile is accelerated at an intermediate level rather than the maximum level, the control advances from the step 756 to a step 770. The step 770 judges whether the A/C switch is turned on to activate the refrigeration cycle and the air-conditioner is set to a condition which needs a maximum cooling. This condition is realized when the blower capacity is manually set at a maximum level in the A/C mode, or when the setting temperature determined by the temperature setter 60 is minimal. If the step 770 judges that the cooling setting is a condition not requiring the maximum cooling (NO), then a step 772 judges whether the passenger compartment temperature Tr exceeds a predetermined value X to see if the passenger compartment temperature is high or low. Thus, the steps 770 and 772 constitute an air-conditioning preference judgment means which judges the current condition is an air-conditioning (cooling) preference condition in which the need for a cooling operation exceed a predetermined level.

If the air-conditioning preference judgment means judges that the need for the cooling operation is lower than the predetermined level, the control advances to a step 774. The step 774 starts a timer in the microcomputer 47 to count or time a period of time elapsing after the judgment of the intermediate accelerated condition. Subsequently, a step 776 sets the $I_{SOL}$ to the $i_1$ value so as to minimize the displacement of the compressor 9. Following steps 778, 780, and 782 perform control operations which are identical to those performed by the steps 764, 766, and 768 stated above. Thus, when the need for the maximum cooling is low, this means that cooling of the passenger compartment is needed, however, it may not be performed in preference to lowering of the engine load at the accelerated condition. Thus, the accelerating ability of the automobile can be maintained.

When the air-conditioning preference judgment means judges that the need for cooling exceeds the predetermined level (YES in the step 770 or 772), the control goes on to a step 784. The step 784 preferentially performs the need for cooling and hence drive the compressor 9 in the normal control mode, thereby cooling the passenger compartment rapidly.

The judgment of the preferential air-conditioning by the step 770 or 772 may further includes a judgment to determine whether the total signal value $T_1$ exceeds a predetermined level or to determine whether the head part total signal $T_3$ exceeds a predetermined level. When $T_1$ exceeds the predetermined level, or when $T_3$ exceeds the predetermined level, the air-conditioning capacity (cooling capacity) is increased in preference to the accelerating ability.

The air-Conditioner is started when a non-illustrated start switch is turned on. In the case where the fuel injection controller 53 inputs a signal representing an non-accelerated traveling condition of the automobile with the AUTO switch 57a depressed, the displacement of the compressor 9 is controlled according to the total signal. In this instance, the thermo-control is also performed.

When the automobile is accelerated beyond the predetermined level (in the illustrated embodiment, when the automobile is accelerated at a maximum level), the operation of the compressor 9 is stopped. When the automobile is accelerated at the intermediate level, the compressor varies its displacement under the control of the total signal if the need for a preferential air-conditioning (cooling) is present. Thus, the cooling capacity can be maintain. Only when the need for the preferential air-conditioning (cooling) is not present, the displacement of the compressor is reduced whereby the engine power is used for the purpose of acceleration of the automobile in preference to the purpose of air-conditioning of the passenger compartment.

Obviously, various minor changes and modifications of the present invention are possible in the light of the above teaching. It is therefore to be understood that within the scope of the appended claims the invention may be practiced otherwise than as specifically described.

What is claimed is:

1. An air-conditioner for an automobile, comprising:
   (a) a variable displacement compressor adapted to be driven by an engine of the automobile;
   (b) thermal load calculation means for calculating a thermal load in a passenger compartment of the automobile based on, at least, an outside air temperature, a temperature in the passenger compartment, and a setting temperature;
   (c) displacement adjustment means for controlling a displacement of said compressor according to the result of calculation by said thermal load calculation means, said displacement adjustment means being operative to reduce the displacement of said compressor to a minimum irrespective of the result of calculation by said thermal load calculation means when an external command signal tending to minimizing the displacement of said compressor is inputted;

(d) air-conditioning preference judgment means for judging whether or not the thermal load condition in the passenger compartment is an air-conditioning preference condition in which said compressor is continuously operated without reducing its displacement to a minimum even when said external command signal is inputted wherein said air-conditioning preference condition is a condition in which an A/C switch is turned on, a defrost mode switch is turned on, said setting temperature is minimal, a total signal has a value greater than a first predetermined level, or a head part total signal has a value greater than a second predetermined level and a delayed outside air temperature has a value greater than a third predetermined level; and (e) input inhibiting means for inhibiting said external command signal from being inputted into said displacement adjustment means when judgment by said air-conditioning preference judgment means indicates that the thermal load condition is said air-conditioning preference condition.

2. An air-conditioner according to claim 1, wherein said variable displacement compressor is a swash plate type variable displacement compressor and includes a swash plate pivotally disposed within a crank chamber and tiltable at an angle which varies with the pressure in said crank chamber for adjusting the displacement of said variable displacement compressor.

3. An air-conditioner according to claim 1, wherein said variable displacement compressor includes a crank chamber, said displacement adjustment means comprises a pressure control valve disposed in said crank chamber and operative to vary its opening in proportion to the magnitude of an electric current applied thereto.

4. An air-conditioner for an automobile, comprising:

(a) a variable displacement compressor adapted to be driven by an engine of the automobile;

(b) thermal load calculation means for calculating a thermal load in a passenger compartment of the automobile based on, at least, an outside air temperature, a temperature in the passenger compartment, and a setting temperature;

(c) displacement adjustment means for controlling a displacement of said compressor according to the result of calculation by said thermal load calculation means;

(d) acceleration detection means for detecting an acceleration of the automobile;

(e) traveling condition judgment means for making a judging based on an output from said acceleration detection means to determine whether the automobile is accelerated above a predetermined level, is accelerated at an intermediate level lower than said predetermined level or is not accelerated;

(f) air-conditioning preference judgment means for judging whether or not the passenger compartment is in an air-conditioning preference condition in which said compressor is continuously operated without reducing its displacement; and (g) compressor drive control means for controlling the operation of said compressor in such a manner that said compressor is stopped when the judgment by said traveling condition judgment means indicates that the automobile is accelerated at said predetermined level, said compressor reduces its displacement irrespective of the result of calculation by said thermal load calculation means when the judgment by said traveling condition judgment means indicates that the automobile is accelerated at said intermediate level and when the judgment by said air-conditioning preference judgment means indicates that the passenger compartment is not in said air-conditioning preference condition, and said compressor varies its displacement under the control of said displacement adjustment means in the other cases.

5. An air-conditioner according to claim 4, wherein said variable displacement compressor is a swash plate type variable displacement compressor and includes a swash plate pivotally disposed within a crank chamber and tiltable at an angle which varies with the pressure in said crank chamber for adjusting the displacement of said variable displacement compressor.

6. An air-conditioner according to claim 4, wherein said variable displacement compressor includes a crank chamber, said displacement adjustment means comprises a pressure control valve disposed in said crank chamber and operative to vary its opening in proportion to the magnitude of an electric current applied thereto.

7. An air-conditioner according to claim 4, wherein said acceleration detection means is operative to detect an amount of depression of an accelerator pedal of the automobile.

8. An air-conditioner according to claim 4, wherein said air-conditioning preference condition is a condition in which said setting temperature is minimal, or the automobile is accelerated at said intermediate level and said passenger compartment temperature is greater than a predetermined level.

* * * * *